Figure 1:
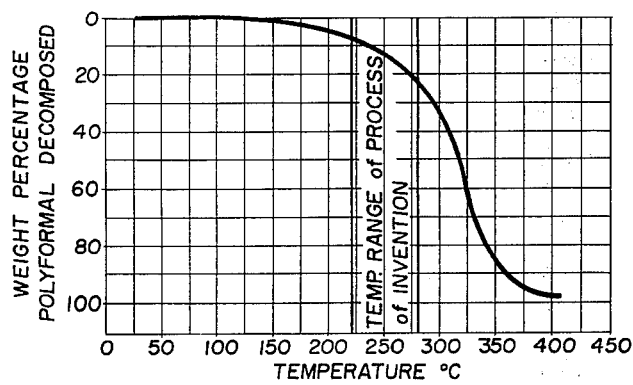

United States Patent [19]
Musser et al.

[11] 3,943,189
[45] Mar. 9, 1976

[54] PROCESS FOR PREPARATION OF COPOLYMERS FROM POLYESTERS AND ALIPHATIC POLYFORMALS

[75] Inventors: Harry Robert Musser; Winston Jerome Jackson, Jr., both of Kingsport, Tenn.

[73] Assignee: Eastman Kodak Company, Rochester, N.Y.

[22] Filed: Nov. 29, 1974

[21] Appl. No.: 528,188

[52] U.S. Cl. ............................... 260/860; 260/75 T
[51] Int. Cl.² ............... C08G 63/60; C08L 67/00
[58] Field of Search .......................... 260/860, 75 T

[56] References Cited
UNITED STATES PATENTS

| | | |
|---|---|---|
| 2,382,938 | 8/1945 | Gresham .............................. 260/67 |
| 2,968,646 | 1/1961 | Caldwell et al. ...................... 260/67 |
| 3,023,192 | 2/1962 | Shivers ................................. 260/75 |
| 3,547,888 | 12/1970 | Sardessai et al. ..................... 260/75 |
| 3,580,973 | 5/1971 | Kennedy et al. ..................... 260/860 |
| 3,644,574 | 2/1972 | Jackson et al. ...................... 260/873 |
| 3,766,146 | 10/1973 | Witsiepe ............................. 260/75 R |
| 3,875,257 | 4/1975 | Musser et al. ...................... 260/860 |

Primary Examiner—Howard E. Schain
Assistant Examiner—Edward Woodberry

[57] ABSTRACT

Disclosed is a process for preparation of copolymers which have an inherent viscosity of at least 0.4 and are formed from polyesters and aliphatic polyformals. The process comprises contacting within a temperature range of 220° to 280°C. a poly(tetramethylene terephthalate) type polyester and selected aliphatic polyformals.

5 Claims, 3 Drawing Figures

PROCESS FOR PREPARATION OF COPOLYMERS FROM POLYESTERS AND ALIPHATIC POLYFORMALS

This invention relates to a process for preparation of copolymers from selected aliphatic polyformals and a poly(tetramethylene terephthalate) type polyester.

The use of modified polyesters to prepare fibers and molded articles has increased tremendously over the years. Not only have many materials been physically admixed into polyesters to produce fibers and molded products having particular properties, but also polyesters have been chemically modified to produce fibers and molded objects having particular properties.

One particularly interesting approach to modifying polyesters is the preparation of polyesters which have an elastomeric character. These elastomeric polyesters can be prepared through chemical modification of the polyester using, as a comonomer, a diol having polyether linkages. This modification incorporates polyether linkages into the polyester to form a block copolymer having polyester segments and polyether segments. As disclosed in U.S. Pat. No. 3,023,192, the polyether segment can comprise a wide variety of material, such as poly(alkylene oxide)glycols and polyformals. These block copolymers of polyesters and polyformals can be prepared in a number of ways, such as direct esterification and ester interchange.

We have now discovered a process for preparing these type of copolymers by contacting an aliphatic polyformal and a poly(tetramethylene terephthalate) type polyester. The process can be thought of as a glycolysis reaction between the poly(tetramethylene terephthalate) type polyester and the aliphatic polyformal. According to this process a copolymer having an inherent viscosity of at least 0.4 is prepared by contacting within a temperature range of 220° to 280°C.

A. a poly(tetramethylene terephthalate) type polyester comprised of
  1. a dicarboxylic acid which is at least 80 mole percent terephthalic acid, and
  2. a diol which is at least 80 mole percent 1,4-butanediol, and
B. based on the weight of the copolymer, from 10 to 60 weight percent of a polyformal having an inherent viscosity of at least 0.05 corresponding to the structure

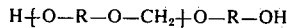

wherein R is

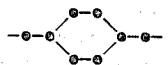

a linear aliphatic divalent radical having 2 to 10 carbon atoms, or

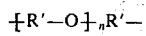

where R' is a linear aliphatic divalent radical having 2 to 4 carbon atoms and n is an integer from 1 to 10.

The process of this invention is thought to be unobvious because it would be unobvious that the process of the invention could be used to prepare a copolymer having an inherent viscosity of at least 0.4 because the polyester and polyformal are contacted within a temperature range of 220° to 280°C. and the prior art, as well as laboratory work conducted under the supervision of applicants, teaches that the aliphatic polyformals used in applicants' process decompose within the temperature range of 220° to 280°C. Thus, it would not be expected that the inherent viscosity of the copolymer would be at least 0.4 since the decomposition of the polyformal would be expected to prevent the buildup of the molecular weight to an inherent viscosity of at least 0.4. As is well known in the art, a high molecular weight polymer requires that the monomer components link together to form high molecular weight chains. Even a slight decomposition of one of the monomers will hinder molecular weight buildup. Clearly, it would be unobvious that the process of applicants' invention could be used to prepare a copolymer having an inherent viscosity of at least 0.4 because of the decomposition characteristics of the polyformals useful in applicants invention within a temperature range of 220° to 280°C.

In order to fully appreciate the unobviousness of preparing a copolymer having an inherent viscosity of at least 0.4 because of the decomposition of the polyformal, one must consider the prior art relating to the decomposition of aliphatic polyformals as well as decomposition curves of aliphatic polyformals.

Considering now the prior art relating to the decomposition of the polyformals, W. H. Carothers (J. Am. Chem. Soc., 57, 925, 1935) discloses that when aliphatic polyformals are heated at elevated temperatures in the range of 220°–230°C. they undergo some depolymerization with subsequent formation of monomeric formals which are volatile. Based on this prior art, it would be expected that considerable decomposition of the polyformal would occur when polyformals are contacted with polyester at 220° to 280°C. and, consequently, the inherent viscosity of the copolymer would not be at least 0.4.

Considering now the decomposition characteristics of the aliphatic polyformals useful in the process of this invention, laboratory work accomplished under the supervision of applicants indicates that the aliphatic polyformals useful in the process of the invention are unstable at temperatures within the range of 220° to 280°C.

Figure 2:
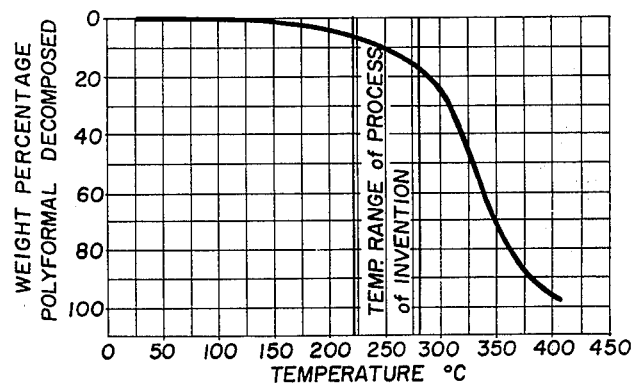
Figure 3:
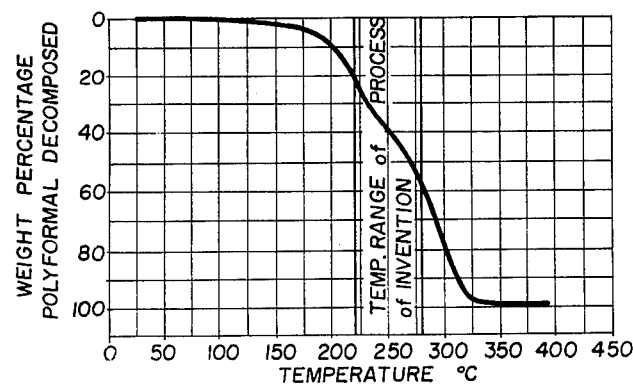

The details of the decomposition characteristics of the aliphatic polyformals useful in the process of this invention can be appreciated by considering FIGS. 1, 2 and 3, which illustrate the decomposition characteristics of several typical aliphatic polyformals useful in the process of this invention. In these Figures the percent of decomposed aliphatic polyformal is plotted on the vertical scale and temperature is plotted on the horizontal scale. Thus, the curve correlates the weight percentage polyformal that has decomposed at any given temperature. These curves were prepared using a DuPont 950 Thermal Gravametric Analyzer. The samples were heated in a nitrogen atmosphere at a rate of 15°C./min. Curves of this type are sometimes called TGA curves by those skilled in the art. In FIGS. 1, 2 and 3 the temperature range of the process of the invention is also illustrated.

Considering now FIG. 1, there is illustrated the percent of decomposed 1,6-hexanediol polyformal at various temperatures ranging from about 25°C. to about 400°C. Considering now in detail the relationship between the temperature range of the process of the invention and the decomposition curve, it is to be observed that the percentage of polyformal decomposed at 220°C. is about 8 percent. Additionally, the percentage of polyformal decomposed at 280°C. is about 22%. The percentage of polyformal decomposed averages about 13% over the entire range of 220°C. to 280°C.

FIG. 2 is similar to FIG. 1 except the aliphatic polyformal is triethylene glycol polyformal. As illustrated in FIG. 2, the percentage polyformal decomposed at 220°C. is about 6 percent, at 280°C. is about 17 percent and averages about 10 percent over the 220° to 280°C. temperature range.

FIG. 3 is also similar to FIG. 1 except the aliphatic polyformal is ethylene glycol polyformal. As illustrated in FIG. 3, the percentage polyformal decomposed at 220°C. is about 24 percent, at 280°C. is about 56 percent and averages about 38 percent over the temperature range of 220° to 280°C.

After considering both the prior art relating to the decomposition of aliphatic polyformals within the temperature range of 220°C. to 280°C. and the decomposition characteristics of aliphatic polyformals in the temperature range of 220° to 280°C., it can be readily understood it would be unobvious that a block copolymer with an inherent viscosity of at least 0.4 could be prepared within a temperature range of 220° to 280°C. because of the decomposition of the aliphatic polyformal.

Broadly the process of this invention can be defined as a process for preparing a copolymer having an inherent viscosity of at least 0.4 comprising contacting within a temperature range of 220° to 280°C.

A. a polyester comprised of
  1. a dicarboxylic acid which is at least 80 mole percent terephthalic acid, and
  2. a diol which is at least 80 mole percent 1,4-butanediol, and B. based on the weight of the copolymer, from 10 to 60 weight percent of a polyformal having an inherent viscosity of at least 0.05 corresponding to the structure

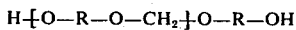

wherein R is

a linear aliphatic divalent radical having 2 to 10 carbon atoms, or

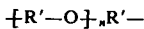

where R' is a linear aliphatic divalent radical having 2 to 4 carbon atoms and n is an integer from 1 to 10.

The contacting of the polyester and polyformal can be accomplished in several ways. According to one method that is particularly suitable when the polyformal is a viscous liquid at ambient conditions, the polyformal can be heated to a slightly elevated temperature, such as 50°C., and the polyester in granulated form can then be admixed with the molten polyformal. According to another method particularly applicable when the polyformal is a grindable solid, the contacting of the polyester and polyformal can be accomplished by granulating both the polyester and the polyformal, mixing the granulated materials to form an admixture and subsequently heating the admixture within the temperature range of 220° to 280°C. to form the copolymer. The polyester and polyformal can be granulated at ambient temperature by a variety of conventional means including conventional commercial polymer grinding equipment. Although the size of the granules can vary widely depending on the needs of the practitioner of the invention, granules that will pass through a 3 mm. screen can be conveniently used. The admixing of the polyester and polyformal can be accomplished in a variety of ways known in the art such as tumbling, stirring or the like. In a preferred commercial embodiment the admixture is formed by stirring the granulated polyester into the molten polyformal.

The heating of the admixture to subsequently maintain the melted polymers within the temperature range of 200° to 280°C. can be accomplished in conventional equipment using conventional heating techniques. For example, the admixture of the molten polyformal and granular polyester can be introduced into a typical, commercial size, glass lined, stirred reactor and heat applied.

The thermodynamic conditions for contacting the polyester and polyformal can vary depending on the desires of the practitioner of the invention.

The temperature used to contact the polyester and polyformal can vary from about 220°C. to about 280°C. Temperatures below about 220°C. tend to be insufficient to drive the glycolysis reaction so as to prepare a copolymer having an inherent viscosity of at least 0.4. Temperatures above about 280°C. tend to result in excessive degradation of the polyester and the polyformal so as to result in a copolymer inherent viscosity of less than about 0.4. In a preferred embodiment wherein the polyester in poly(tetramethylene terephthalate) a temperature of 240°–275°C. can be used. This temperature range is preferred because below about 240°C. the poly(tetramethylene terephthalate) is often difficult to melt and above 275°C. the poly(tetramethylene terephthalate) tends to degrade. When the polyester is poly(tetramethylene terephthalate), an even more preferred temperature range is 250° to 255°C. This temperature range is even more preferred because in this range there is achieved a desirable balance between an increased speed of the reaction and a reduced degradation of the poly(tetramethylene terephthalate). The contact between the polyester and the polyformal can be accomplished at several different temperatures as long as the temperatures are within the temperature range of about 220° to about 280°C.

The time used to contact the polyester and the polyformal can vary widely and can be readily selected by those skilled in the art. If short times are employed, higher temperatures are likely to be desirable to achieve an inherent viscosity of at least 0.4. Conversely, if longer times are used lower temperatures can be used and still achieve a copolymer inherent viscosity of at least 0.4. As will be readily appreciated by those skilled in the art, the pressure used to contact the polyester and polyformal will also be influenced by the time selected for contact since lower pressure will promote inherent viscosity buildup. In one preferred embodiment, the time can be within the range of 1 to 3 hours. Other times can be used if desired.

The pressure used to contact the polyester and the polyformal can also vary widely. When pressures around atmospheric are used it is somewhat difficult to achieve the copolymer inherent viscosity of 0.4 because liberation of glycolysis products can be difficult.

Lower pressures are typically more desirable since the lower pressures promote liberation of the glycolysis products. In one specific embodiment the pressure can be in the range of about 0.01 to 1.0 mm Hg. The pressure that is suitable can readily be determined by those skilled in the art.

In this invention the copolymer has an inherent viscosity of at least 0.4. Although the I.V. of the copolymer of this invention is at least 0.4, the inherent viscosity can be higher such as 0.6 or 0.8 or even higher. In this disclosure the inherent viscosity of the copolymer is measured at 25°C. using 0.50 gram of polymer per 100 ml. of a solvent composed of 60 volumes of phenol and 40 volumes of tetrachloroethane.

The dicarboxylic acid component of the polyester is at least 80 mole percent terephthalic acid. The remaining 20 mole percent can be one or more aliphatic, alicyclic, and aromatic dicarboxylic acids having up to 40 carbon atoms. Examples of such acids include malonic; dimethylmalonic; succinic; glutaric; adipic; 2-methyladipic; trimethyladipic; pimelic; 2,2-dimethylglutaric; 3,3-diethylsuccinic; azelaic; sebacic; suberic; fumaric; maleic; itaconic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic; 1,4-cyclohexenedicarboxylic; terephthalic; isophthalic; 4-methyl-isophthalic; t-butylisophthalic; 2,5-norbornanedicarboxylic; 1,4-naphthalic; diphenic; 4,4'-oxydibenzoic; 4,4'-methylenedibenzoic; diglycolic; thiodipropionic; 4,4'-sulfonyldibenzoic; 2,5-naphthalendeicarboxylic; 2,6-naphthalenedicarboxylic; and 2,7-naphthalenedicarboxylic acids. It will be understood that the corresponding esters of these acids are included in the term "dicarboxylic acid". Two or more of the above dicarboxylic acids can be used in combination. In a preferred embodiment the dicarboxylic acid component is terephthalic acid.

The diol component of the polyester is at least 80 mole percent tetramethylene glycol, also called 1,4-butanediol. The remaining 20 mole percent can be an aliphatic, alicyclic, and aromatic diol having up to 40 carbon atoms. Examples of such diols include ethylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 3-ethyl-2-isobutyl-1,3-propanediol; 1,3-butanediol; 1,4-butanediol; 1,5-pentanediol; 1,6-hexanediol; 1,10-decanediol; 2,2,4-trimethyl-1,6-hexanediol; 1,4-cyclohexanediol; 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylene diols; 2,5-naphthalenediol; and 2,5-norbornanediol. The polyester may contain two or more of the above diols in combination.

The polyesters used in the process of this invention can be prepared in accordance with procedures well known in the art. For example, a dialkyl ester of a dicarboxylic acid, such as dimethyl terephthalate, can be ester interchanged to form a diester, such as bis-4-hydroxytetramethyl terephthalate, and the diester then polycondensed at elevated temperatures and reduced pressures.

The inherent viscosity of the polyesters of this invention can vary widely. Polyesters having inherent viscosities of about 0.1 can be used. In a preferred embodiment the inherent viscosity can be at least 0.5.

The inherent viscosity of the polyester is measured at 25°C. using 0.50 gram of polymer per 100 ml. of a solvent composed of 60 volumes of phenol and 40 volumes of tetrachloroethane.

The aliphatic polyformal of this invention can be described as a polyformal having an inherent viscosity of at least 0.05 corresponding to the structure

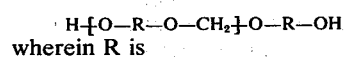

wherein R is

a linear aliphatic divalent radical having 2 to 10 carbon atoms, or $+R'-O+_nR'-$ where R' is a linear aliphatic divalent radical having 2 to 4 carbon atoms and n is an integer from 1 to 10.

The linear aliphatic divalent radical R is the divalent radical remaining after the removal of the hydroxyl groups from a linear aliphatic diol having 2 to 10 carbon atoms. Examples of suitable diols include ethylene glycol, propylene glycol, tetramethylene glycol, pentamethylene glycol, hexamethylene glycol, heptamethylene glycol, octamethylene glycol, nonamethylene glycol and decamethylene glycol. 1,6-Hexamethylene glycol is preferred. Mixtures of divalent radicals can be used. When 1,6-hexamethylene diol is used R is $-CH_2CH_2CH_2CH_2CH_2CH_2-$. The radical

is the divalent radical remaining after removal of the hydroxy groups from 1,4-cyclohexanedimethanol.

The linear aliphatic divalent radical R' is the divalent radical remaining after removal of the hydroxy groups from a linear aliphatic diol having 2 to 4 carbon atoms. The linear aliphatic diol can be ethylene glycol, propylene glycol or butylene glycol. As will be recognized by those skilled in the art, the unit

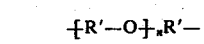

where n is an integer 1 to 10 is the divalent radical remaining after removal from the hydroxy groups from a poly(alkyleneoxide glycol). Examples of pol(alkyleneoxide glycols) that can be used are triethylene glycol, heptaethylene glycol, decaethylene glycol, hexapropylene glycol, dipropylene glycol, dibutylene glycol, pentabutylene glycol, octabutylene glycol and the like.

The polyformal of this invention can be prepared by a process comprising contacting in a solvent, under polymerization conditions and in the presence of a suitable acid catalyst, formaldehyde and the appropriate diol.

The solvent useful in this process can comprise a solvent that is inert with regard to the reactants. Although many conventional solvents can be used, benzene, toluene and hexane are preferred because poly(alkyleneoxide their cost and availability.

The pressure used for formation of the polyformal can vary widely. Pressures higher than atmospheric can be used but water removal is, of course, more difficult at elevated pressures. Pressures lower than atmospheric can be used, but low pressures are to some extent undesirable because low pressures will tend to allow the formaldehyde to escape from the inert solvent. Atmospheric pressure is preferred because of the ease of creation as well as the minimization of undesirable side effects.

The temperature used for formation of the polyformal can also vary widely. Temperatures above about 100°C. can be used but are to some extent undesirable because the formaldehyde will tend to escape from the polymerization solvent.

The acid catalyst of this invention can be a variety of catalysts that function as proton donors to catalyze the polymerization reaction. Examples of acids that could be used include p-toluenesulfonic acid, sulfuric acid, trifluoromethanesulfonic acid, methanedisulfonic acid, camphorsulfonic acid, perchloric acid, and sulfonated resins.

In this invention the formaldehyde can be in various forms such as paraformaldehyde or gaseous formaldehyde. Paraformaldehyde is preferably used because of its ease in handling, lack of color forming impurities, and its ability to form high molecular weight polyformals. When paraformaldehyde is used the acid catalyst not only functions as a proton donor to catalyze the polymerization reaction, but, in addition, functions to depolymerize the paraformaldehyde.

The contact between the aliphatic diol and formaldehyde can be preferably effected by merely stirring a solution of the formaldehyde and the aliphatic diol in the solvent. If desired, other contacting procedures well known in the art could be used, such as packed towers, bubble towers and the like.

After polymerization is complete, isolation of the polyformal can be accomplished by techniques well known in the art such as removal of the solvent or precipitation in a nonsolvent, such as methanol.

The aliphatic polyformals can also be prepared using other procedures disclosed in U.S. Pat. No. 2,968,646.

The inherent viscosity of the polyformal is at least 0.05. Preferably the inherent viscosity is higher, for example 0.1. The inherent viscosity of the polyformal is measured at 25°C. using 0.50 gram of polymer per 100 ml. of a solvent composed of 60 volumes of phenol and 40 volumes of tetrachloroethane.

In this invention the polyformal can comprise from 10 to 60 weight percent polyformal, based on the weight of the copolymer. The amount of polyformal to be employed depends on the properties of the copolymer, particularly the elastomeric character, that are desired. If less polyformal is used the elastomeric character of the copolymer will be reduced. If more polyformal is used the elastomeric character of the copolymer will be increased. In a preferred embodiment the polyformal can comprise from 30 to 45 weight percent polyformal. This range of polyformal is preferred because this range of polyformal produces a copolymer having the combination of a suitable elastomeric character and a good overall balance of properties.

The process of this invention can be more fully understood by considering a typical practice of the invention.

One hundred and twenty eight grams of poly(tetramethylene terephthalate) having an inherent viscosity of 1.10 is granulated at room temperature by use of a Wiley Mill into granules passing through a 3 mm. screen. Thirty two grams of 1,6-hexanediol polyformal having an inherent viscosity of 0.18 are placed into a 500 ml. flask as a very viscous liquid and heated to about 50°C. to reduce the viscosity of the polyformal. The granules of the polyester are introduced into the 500-ml. flask and the granules of polyester and the molten polyformal are formed into an admixture by first shaking the flask to accomplish preliminary mixing and subsequently the mixture is stirred while heating under nitrogen. As soon as the polyester granules have melted, the temperature is elevated to 255°C. and maintained at 255°C. and a vacuum of 0.3 mm applied for 90 minutes, during which time reaction occurs to form the block copolymer having an inherent viscosity of 0.86. Articles molded from the copolymer exhibit an elastomeric character as well as an overall balance of properties suitable for a typical molded article.

Although the invention has been described in detail with particular reference to certain preferred embodiments thereof, it will be understood that variations and modifications may be made within the spirit and scope of the invention.

We claim:
1. A process for preparing a copolymer having an inherent viscosity of at least 0.4 measured at 25°C. using 0.50 gram of polymer per 100 ml. of a solvent composed of 60 volumes of phenol and 40 volumes of tetrachloroethane comprising contacting within a temperature range of about 220 to about 280°C.
   A. a polyester comprised of
      1. a dicarboxylic acid which is at least 80 mole percent terephthalic acid, and
      2. a diol which is at least 80 mole percent 1,4-butanediol, and
   B. based on the weight of the copolymer, from 10 to 60 weight percent of a polyformal having an inherent viscosity of at least 0.05 measured at 25°C. using 0.50 gram of polymer per 100 ml. of a solvent composed of 60 volumes of phenol and 40 volumes of tetrachloroethane corresponding to the structure

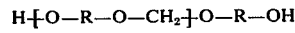

wherein R is

a linear aliphatic divalent radical having 2 to 10 carbon atoms, or

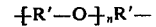

where R' is a linear aliphatic divalent radical having 2 to 4 carbon atoms and n is an integer from 1 to 10.

2. The process of claim 1 wherein the polyester is poly(tetramethylene terephalate).

3. The process of claim 2 wherein the temperature range is 240°–275°C.

4. The process of claim 3 wherein R is —CH₂CH₂CH₂CH₂CH₂CH₂—.

5. A process for preparing a copolymer having an inherent viscosity of at least 0.8 measured at 25°C. using 0.50 gram of polymer per 100 ml. of a solvent composed of 60 volumes of phenol and 40 volumes of tetrachloroethane comprising contacting within a temperature range of about 250° to 255°C., within a pressure range of about 0.01 to 1.0 mm Hg and for a time within the range of about 1 to 3 hours A. poly(tetramethylene terephthalate) having an inherent viscosity of at least 0.5 measured at 25°C. using 0.50 gram of polymer per 100 ml. of a solvent composed of 60 volumes of phenol and 40 volumes of tetrachloroethane, and B. based on the weight of the copolymer, from 30 to 45 weight percent of 1,6-hexanediol polyformal having an inherent viscosity of at least 0.1 measured at 25°C. using 0.50 gram of polymer per 100 ml. of a solvent composed of 60 volumes of phenol and 40 volumes of tetrachloroethane.

* * * * *